United States Patent Office
3,493,564
Patented Feb. 3, 1970

3,493,564
2,19-EPOXY-Δ$^{4,6}$-STEROIDS AND INTERMEDIATES FOR THEIR SYNTHESIS
Gunther Krüger, St. Laurent, Montreal, Quebec, and Anthonie Verwijs, Pierrefonds, Quebec, Canada, assignors to American Home Products Corporation, New York, N.Y., a corporation of Delaware
No Drawing. Filed Feb. 29, 1968, Ser. No. 709,217
Int. Cl. C07c *173/00*
U.S. Cl. 260—239.55                 5 Claims

ABSTRACT OF THE DISCLOSURE

There is disclosed herein 2,19-epoxy-17β-hydroxyandrosta-4,6-diene-3-one and its 17-acetate, 17-propionate, 17-butyrate and 17-pivalate, as well as 2,19-epoxycholesta-4,6-dien-3-one and the corresponding 2-(ethoxyoxalyl)-6β,19-epoxides, 2α-chloro-, 2α-bromo-, and 2α-fluoro-6β,19-epoxides and 2α-chloro-, 2α-bromo-, and 2α-fluoro-17β,19-dihydroxy derivatives used as intermediates in their preparation. The compounds are useful as cholesterol lowering agents and as intermediates in the preparation of dihydroequilin and equilin, and methods for their preparation and for their use are also disclosed.

---

This invention relates to 2,19-epoxy-Δ$^{4,6}$-3-ketosteroids, particularly 2,19 - epoxycholesta-4,6-dien-3-one, 2,19-epoxy-17β-hydroxyandrosta-4,6-dien-3-one and 17-esters of the latter compound, to processes for their synthesis and to intermediate used in these processes.

More specifically, this invention relates to 2,19-epoxy-Δ$^{4,6}$-3-ketosteroids of Formula I:

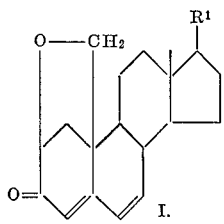

I.

in which R$^1$ represents the hydroxy group, an acyloxy group containing from 2–5 carbon atoms, such as, for example, the acetoxy, propionyloxy, butyryloxy and pivaloyloxy group, or the 1,5-dimethylhexyl group.

The new 2,19-epoxy-Δ$^{4,6}$-3-keto steroids of this invention have been found to possess interesting pharmacological properties. More particularly, those compounds, in standard pharmacological tests, for example, in a procedure similar to that described by Kraml et al. in J. Med. Chem., vol. 7, p. 500 (1964) for the testing of agents affecting cholesterol concentrations in the blood serum, have exhibited activities as cholesterol lowering agents.

When the compounds of this invention are employed as cholesterol lowering agents in warm-blooded animals, e.g., in rats, alone or in combination with pharmacologically acceptable carriers, the dosage of the compound and the proportion of carriers is determined by the solubility and chemical nature of the compound, by the chosen route of administration and by standard biological practice. For example, the compounds may be administered orally in solid form containing such excipients as starch, lactose, certain types of clay, lubricants such as magnesium stearate, and similar ingredients. They may also be administered orally in the form of solutions, or they may be injected parenterally. For parenteral administration the compounds of this invention may be administered in the form of sterile solutions containing other solutes, for example, sodium chloride or glucose to make the solution isotonic.

The dosage of the compounds of this invention will vary with the form of administration and the particular compound chosen, as well as with the particular host under treatment. Generally, treatment is initiated with small dosages substantially less than the optimum dose of the compound. Thereafter, the dosage is increased by small increments until the optimum effect under the circumstances is reached.

In general, the compounds of this invention are most desirably administered at a concentration dosage level which will generally afford effective results without causing any harmful side effects, and preferably at a level that is in a range of from about 5 mg. to about 100 mg. per kilo body weight per day, although certain variations will occur as noted above. However, a dosage level in which the range is about 25 mg. to about 50 mg. per kilo body weight per day is most desirably employed in order to achieve effective results.

Furthermore, the compounds of this invention in which R$^1$ represents the hydroxy group or an acyloxy group as defined above are also useful as intermediates for preparing the well-known estrogen dihydroequilin from which the highly important estrogen equilin may easily be prepared by oxidation. In this process the compounds of this invention in which R$^1$ represents the hydroxy group or an acyloxy group as defined above are treated with acetic anhydride containing small amounts of p-toluenesulfonic acid at temperatures above 90° C. This results in the formation of the corresponding enol acetate with concomitant opening of the 2,19-epoxide and creation of a double bond in position 1, thus yielding the corresponding 3,19 - diacetoxyandrosta-1,3,5 7-tetraene 17-acylate. Treatment of the latter compound with a mild base, such as for example sodium bicarbonate or ammonia, will give the corresponding 3-ketone as a transitory intermediate which is, however, not isolated but yields the corresponding dihydroequilin 17-acylate upon further contact with the mild base specified above. Conventional hydrolysis of that last-named compound yields dihydroequilin, from which equilin is obtained by conventional oxidation.

The compounds of this invention are prepared by a process illustrated by the following formulae,

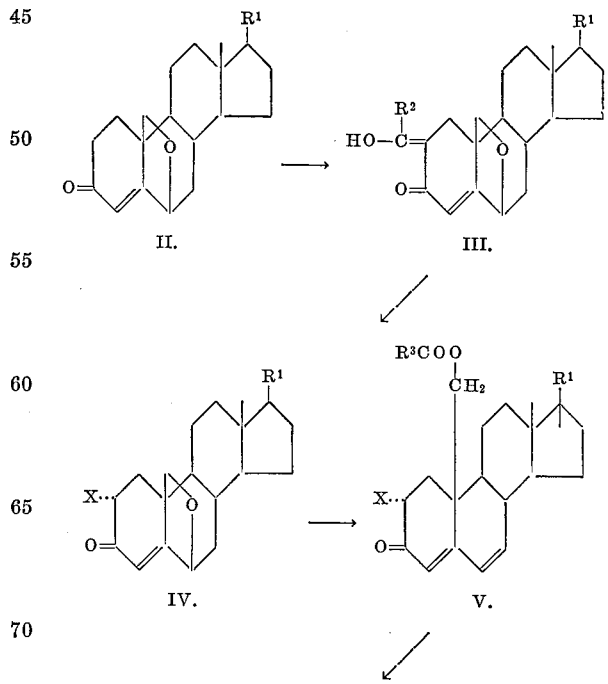

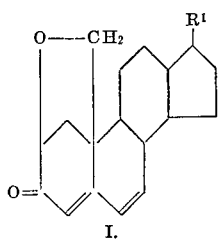

in which R¹ is as defined above, R² represents a hydrogen atom or an ethoxycarbonyl group, R³ represents a methyl or ethyl group, and X represents a fluorine, chlorine or bromine atom. It should be noted that under the conditions, used for the conversion V→I, R¹ represents an acetoxy, propionyloxy or butyryloxy group, such groups are hydrolyzed to yield the compound of Formula I in which R¹ represents a hydroxy group. However, subsequent treatment of this latter compound with the appropriate acyl anhydride or acyl chloride in the presence of an acid acceptor, preferably in pyridine solution readily furnishes the compounds of this invention of Formula I in which R¹ represents acetoxy, propionyloxy and butyryloxy.

For the above process, we prefer to use as starting material 6β,19-epoxycholest - 4 - en-3-one, described by H. Dannenburg et al., in Ann. Chem., 673, 152 (1964), or 6β,19-epoxy-17β-hydroxyandrost-4-en-3-one, described by K. Heusler et al., in Experientia, 18, 464 (1962). The 17-ester derivatives of the latter compound for example, the acetate, propionate, butyrate or pivalate, may be used with equal facility as starting materials; these compounds are readily prepared from said latter compound by treatment with the appropriate acyl anhydride or acyl chloride in pyridine solution.

The starting materials of Formula II are treated with either ethyl formate or diethyl oxalate in the presence of a basic condensing agent, for example, sodium hydride or sodium methoxide, in an inert solvent, for example, benzene, to yield the corresponding 2-(hydroxymethylene) or 2-(ethoxyoxalyl) derivatives of Formula III.

The latter intermediates are allowed to react with a reagent capable of furnishing a positively charged halogen ion, such as, for example, perchloryl fluoride, N-chlorosuccinimide, or N-bromosuccinimide, for furnishing, F⁺, Cl⁺ and Br⁺ respectively, and with a base, such as, for example, sodium hydroxide or sodium carbonate to yield the corresponding 6β,19 - epoxy-2α-halo-Δ⁴-3-ketosteroids of Formula IV. These latter steroids are capable also of reducing the concentration of cholesterol in the blood serum and may be used for this purpose in the same manner as the compounds of this invention of formula I.

The 6β,19-epoxy-2α-halo-Δ⁴-3-ketosteroids of Formula IV are readily converted to the 19-acyloxy-2α-halo-Δ⁴,⁶-3-ketosteroids of Formula V upon treatment with an acyl anhydride such as, for example, acetic anhydride or propionic anhydride, in the presence of an acid catalyst, such as for example, p-toluenesulfonic acid. These compounds also possess the ability to reduce the concentration of cholesterol in the blood serum and may be used for this purpose in the same manner as the compounds of this invention of Formula I.

The compounds of this invention of Formula I in which R¹ represents the hydroxy the pivaloyloxy or the 1,5-dimethylhexyl group are obtained by treating the 19-acyloxy-2α-halo-Δ⁴,⁶-3-ketosteroids of Formula V with either a basic agent such as, for example, potassium hydroxide, or with a dilute acid such as, for example, dilute hydrochloric acid.

Finally, the compounds of this invention of Formula I in which R¹ represents an acyloxy group containing from 1–5 carbon atoms are obtained by the treatment of the compound of Formula I, in which R¹ represents the hydroxy group, with the appropriate acyl anhydride or acyl chloride in the presence of an acid acceptor, preferably, in pyridine solution.

The following examples will illustrate the scope of this invention.

EXAMPLE 1

A solution of 5.0 g. of 6β,19-epoxy-17β-hydroxyandrost-4-en-3-one in 20 ml. of pyridine is heated with 7.5 ml. of pivaloyl chloride at 100° C. under nitrogen for two hours. The reaction mixture is diluted with 100 ml. of water and allowed to stand at room temperature for one hour during which time an oil separates and crystallizes. The crystals are collected, dried at 60° C. and recrystallized from methanol to afford 6β,19-epoxy-17β-hydroxyandrost-4-en-3-one 17-pivalate; (II, R¹=OCOC(CH₃)₃) M.P. 157–158° C.

$\lambda_{max}^{EtOH}$ 238 mμ (ε 14,300)

In the same manner, but using an equivalent amount of either the corresponding acyl anhydrides or acyl chlorides derived from acetic, propionic or butyric acid, instead of pivaloyl chloride, 17-acetate, 17-propionate and 17-butyrate esters of 6β,19-epoxy-17β-hydroxyandrost-4-en-3-one are obtained respectively.

EXAMPLE 2

A mixture of 8 g. of 6β,19-epoxy-17β-hydroxyandrost-4-en-3-one 17-pivalate, 8 g. of 54% sodium hydride dispersed in mineral oil, 8 ml. of dry benzene and 8 ml. of diethyl oxalate is stirred under nitrogen at room temperature. After three hours a vigorous reaction ensued necessitating cooling. After four hours the reaction mixture is treated with 400 ml. of hexane and 200 ml. of partially frozen 1 N aqueous hydrochloric acid. The resulting yellow precipitate is collected, washed with hexane and water, and dried over calcium chloride yielding 9.5 g. of 2 - (ethoxyoxalyl)-6β,19-epoxy-17β-hydroxyandrost-4-en - 3 - one 17-pivalate (III, R¹=OCOC(CH₃)₃, R²= (COOC₂H₅) M.P. 157–166° C., which may be used for the next step without further purification.

In the same manner, but using an equivalent amount of 6β,19-epoxycholest-4-en-3-one, 6β,19-epoxy-17β-hydroxyandrost-4-en-3-one, or the corresponding 17-acetate, 17-propionate or 17-butyrate of the latter compound instead of 6β,19-epoxy-17β-hydroxyandrost-4-en-3-one 17 - pivalate-2-(ethoxyoxalyl)-6β,19-epoxy-cholest-4-en-3 - one, 2 - (ethoxyoxalyl)-6β,19-epoxy-17β-hydroxyandrost-4-en-3-one and the corresponding 17-acetate, 17-propionate and 17-butyrate of the latter compound, are obtained respectively.

In the same manner, but using an equivalent amount of ethyl formate instead of diethyl oxalate 2-(hydroxymethylene) - 6β,19-epoxy-17β-hydroxyandrost-4-en-3-one 17-pivalate is obtained.

In the same manner, but using an equivalent amount of ethyl formate instead of diethyl oxalate and an equivalent amount of 6β,19-epoxycholest-4-en-3-one, 6β19-epoxy-17β-hyroxyandrost-4-en-3-one, or the corresponding 17-acetate, 17-propionate or 17-butyrate of the latter compound instead of 6β,19-epoxy-17β-hydroxyandrost-4-en-3-one pivalate 2-(hydroxymethylene)-6β,19-epoxycholest - 4-en-3-one, 2-(hydroxymethylene)-6β,19-epoxy-17β-hydroxyandrost-4-en-3-one and the corresponding 17-acetate, 17-propionate and 17-butyrate of the latter compound, are obtained respectively.

EXAMPLE 3

A solution of 6.0 g. of 2-(ethoxyoxalyl)-6β,19-epoxy-17β-hydroxyandrost-4-en-3-one 17-pivalate in 30 ml. of pyridine is treated with 1.62 g. of N-chlorosuccinimide at 0° C., under nitrogen for 18 minutes, whereupon 180 ml. of 10% aqueous potassium hydroxide is added. The resulting precipitate is collected, washed with water, and dried yielding 2α - chloro-6β-19-epoxy-17β-hydroxyandrost-4-en-3-one 17-pivalate (IV, R¹=OCOC(CH₃)₃, X=Cl) as an off-white powder, which is suitable for the next step. A pure sample of this 2α-chloro derivative, M.P. 209–212° C., is obtained by crystallization from methano.

In the same manner, but using an equivalent amount of 2 - (hyroxymethylene) - 6β,19-epoxy-17β-hydroxyandost-4-en-3-one 17-pivalate instead of 2-(ethoxyoxalyl)-6β,19 - epoxy-17β-hydroxyandrost-4-en-3-one 17-pivalate 2α-chloro-6β,19-epoxy-17β-hydroxyandrost-4-en-3-one 17-pivalate is also obtained.

In the same manner, but using an equivalent amount of 2-(hydroxymethylene)- or 2-(ethoxyalyl)-6β,19-expoycholest - 4 - en-3-one, -6β,19-epoxy-17β-hydroxyandrost-4-en-3-one or the 17-acetate, 17-propionate or 17-butyrate esters of 2-(hydroxymethylene)- or 2-(ethoxyoxalyl) - 6β,19 - epoxy-17β-hydroxyandrost-4-en-3-one instead of 2 - (ethoxyoxalyl - 6β-19-epoxy-17β-hydroxyandrost-4-en-3-one pivalate, 2α-chloro-6β-19-epoxycholest-4-en-3-one (M.P. 176–1770 C.), 2α-chloro-6β,19-epoxy-17β-hyroxyandrost-4-en-3-one, and the 17-acetate, 17-propionate and 17-butyrate of the latter compound, are obtained, respectively.

In the same manner, but using an equivalent amount of N-bromosuccinimide instead of N-chlorosuccinimide, 2α-bromo-6,19-epoxy-17β-hydroxyandrost-4-en-3-one 17-pivalate is obtained.

In the same manner, but using an equivalent amount of N-bromosuccinimide instead of N-chlorosuccinimide, and an equivalent amount of 2-(hydroxymethylene)- or -2-(ethoxyoxalyl)-6β,19-epoxycholest-4-en-3-one, -6β,19-epoxy-17β-hydroxyandrost-4-en-3-one or the 17-acetate, 17-propionate or 17-butyrate esters of 2-(hydroxymethylene) or 2 - (ethoxyoxalyl)-6β,19-epoxy-17β-hydroxyandrost-4-en-3-one instead of 2-(ethoxyoxalyl)-6β,19-epoxy-17β-hyroxyandrost-4-en-3-one pivalate, 2α-bromo-6β,19 - epoxycholest - 4-en-3one, 2α-bromo-6β,19-epoxy-17β-hydroxyandrost-4-en-3-one and the 17-acetate, 17-propionate and the 17-butyrate of the latter compound, are obtained respectively.

EXAMPLE 4

A mixture of 2.0 g. of 2-(ethoxyoxalyl)- or 2-(hydroxymethylene) - 6β,19-epoxy-17-hydroxyandrost-4-en-3-one 17-pivalate and 0.43 g. of sodium carbonate is dissolved in 20 ml. of methanol at 60° C. under nitrogen. The solution is then cooled to 0° C. and treated with a fine stream of perchloryl fluoride gas for three minutes, whereupon the reaction mixture is boiled for five minutes. Dilution with water yields a preciptate, which on recrystallization from from methanol affords 2α-fluoro-6β,19-epoxy - 17β - hydroxyandrost-4-en-3-one 17-pivalate (IV, $R^1=OCOC(CH_3)_3$, X=F) M.P. 218–219.5° C.

$\lambda_{max.}^{EtOH}$ 238 mμ (ε=15,300)

In the same manner, but substituting an equivalent amount of 2-(ethoxyoxalyl)- or 2-(hydroxymethylene)-6β,19 - epoxycholest - 4-en-3-one, -6β,19-epoxy-17β-hydroxyandrost-4-en-3-one or the 17-acetate, 17-propionate or 17 - butyrate of 2-(ethoxyoxalyl)- or 2-(hydroxymethylene) - 6β,19-epoxy-17β-hydroxyandrost-4-en-3-one instead of 2-(ethoxyoxalyl)- or 2-(hydroxymethylene)-6β,19 - epoxy-17β-hydroxyandrost-4-en-3-one 17-pivalate, respectively, 2α-fluoro-6β,19-epoxycholest-4-en-3-one, 2α-fluoro - 6β,19-epoxy-17β-hydroxyandrost-4-en-3-one and the 17-acetate, 17-propionate and 17-butyrate of the latter compound, are obtained, respectively.

EXAMPLE 5

A mixture of 4.6 g. of 2α-chloro-6β,19-epoxy-17β-hydroxyandrost-4-en-3-one-17-pivalate, 23.0 ml. of acetic anhydride and 4.6 g. of p-toluenesulfonic acid is heated at 100° for six minutes. The mixture is then cooled in ice and poured in a fine stream into a saturated solution of ammonia in methanol, cooled externally by an ice-bath. The solution is concentrated to approximately one fifth of the original volume and water is added.

The resulting precipitate is collected and dried, yielding $\lambda_{max.}^{MeOH}$ 285 mμ

2α-chloro-17β,19-dihydroxyandrosta-4,6-dien-3 - one 19-acetate 17-pivalate (V, $R^1=OCOC(CH_3)_3$, $R^3=CH_3$)

$\lambda_{max.}^{MeOH}$ 285 mμ

An analytical sample of this 2α-chloro derivative, M.P. 95° C./141° C.

$\lambda_{max.}^{EtOH}$ 285 mμ (ε 25,800)

is obtained by recrystallization of a portion of the brown solid from methanol.

In the same manner, but using an equivalent amount of 2α-fluoro- or 2α-bromo-6β,19-epoxy-17β-hydroxyandrost-4-en-3-one 17-pivalate instead of 2α-chloro-6β,19-epoxy-17β-hydroxyandrost-4-en-3-one 17-pivalate, 2α-fluoro- and 2α-bromo-17β,19-dihydroxyandrosta-4,6-dien-3-one 19-acetate 17-pivalate are obtained, respectively.

In the same manner, but using an equivalent amount of the 2α-fluoro-, 2α-chloro- or 2α-bromo derivatives of 6β,19-epoxycholest-4-en-3-one, of 6β,19-epoxy-17-hydroxyandrost-4-en-3-one, or of the 17-acetate, 17-propionate or 17-butyrate of the 2α-fluoro-, 2α-chloro-, or 2α-bromo derivatives of the latter compound instead of 2α-chloro-6β,19-epoxy-17β-hydroxyandrost-4-en - 3 - one 17-pivalate, the 2α-fluoro-, 2α-chloro-, or 2α-bromoderivatives of 19-hydroxycholesta-4,6-dien-3-one 19-acetate, of 17β,19-dihydroxyandrosta-4,6-dien-3-one 17,19-diacetate and the 17-acetates, 17-propionates and the 17-butyrates of 2α-fluoro-, 2α-chloro-, and 2α-bromo-17β,19-dihydroxyandrosta-4,6-dien-3-one 19-acetate are obtained, respectively.

In the same manner, but using an equivalent amount of propionic anhydride instead of acetic anhydride, 2α-chloro-17β,19-dihydoxyandrosta-4,6-dien-3-one 17 - pivalate 19-propionate is obtained.

In the same manner, but using an equivalent amount of propionic anhydride instead of acetic anhydride and using an equivalent of 2α-fluoro- or 2α-bromo-6β, 19-epoxy-17-hydroxyandrost-4-en-3-one 17 - pivalate, 2α-fluoro-, 2α-chloro- or 2α-bromo-6,19-epoxycholest-4-en-3-one, 2α-fluoro, 2α-chloro or 2α-bromo-6,19-epoxy-17β-hydroxyandrost-4-en3-one or the 17-acetate, 17-propionate or 17-butyrate of 2α-fluoro-, 2α-chloro- or 2α-bromo-6,19-epoxy-17β-hydroxyandrost-4-en-3 - one, instead of 2α-chloro-6β,19-epoxy-17β-hydroxyandrost-4-en-3-one 17-pivalate, 2α-fluoro or 2α-bromo-17β,19-dihydroxyandrosta-4,6-dien-3-one 17-pivalate 19-propionate 2α-fluoro-, 2α-chloro- or 2α-bromo-19-hydroxycholesta-4,6-dien-3-one 19-propionate, 2α-fluoro-, 2α-chloro- or 2α-bromo-17β,19-dihydroxyandrosta-4,6 - dien - 3 - one 17,19-dipropionate, and the 17-acetate, 17-propionate and 17-butyrate of 2α-fluoro-, 2α-chloro-, or 2α-bromo-17β,19-dihyroxyandrost-4-en-3-one 19-propionate are obtained, respectively.

EXAMPLE 6

A solution of 0.72 g. of potassium hydroxide and 3.6 g. of 2α-chloro-17β,19-dihydroxyandrosta-4,6-dien-3-one 17-pivalate 19-acetate in 72 ml. of methanol is left to stand at room temperature for one hour whereupon one ml. of glacial acetic acid is added. The methanol is removed at reduced pressure and the residue dissolved in a mixture of ethyl acetate and water. The organic phase is dried with sodium sulfate yielding after evaporation and digestion of the residue with methanol, crystalline 2-19,-epoxy-17β-hydroxyandrosta-4,6-dien-3-one 17-pivalate (I, $R^1=OCOC(CH_3)_3$)

Recrystallization from methanol yields a pure sample of the product, M.P. 171.5–172.5° C.

$\lambda_{max.}^{EtOH}$ 285 mμ (ε=26,880)

EXAMPLE 7

A solution of 100 mg. of 2α-chloro-17β,19-dihydroxyandrosta-4,6-dien-3-one 17-pivalate 19-acetate is 2 ml. of 4 N aqueous hydrochloric acid-methanol (1:5) is boiled for six hours. The reaction mixture is then diluted with water and extracted with ethyl acetate. The ethyl acetate extract is dried, and evaporated to dryness. The resulting residue is recrystallized from methanol, yielding pure 2,19-epoxy-17β-hydroxyandrosta-4,6-dien-3-one 17-pivalate, identical with the compound described in Example 6.

EXAMPLE 8

By following the procedure of either Example 6 or Example 7, but using an equivalent amount of 2α-fluoro- or 2α-bromo-17β,19-dihydroxyandrosta-4,6-dien-3 - one 19-acetate 17-pivalate or of 2α-fluoro-, 2α-chloro- or 2α-bromo-17β,19-dihydroxyandrosta-4,6-dien-3-one 17-pivalate 19-propionate instead of 2α-chloro-17β,19-dihydroxyandrosta-4,6-dien-3-one 19-acetate, 17-pivalate, the same compound, 2,19-epoxy-17β-hydroxyandrosta-4,6-dien-3-one 17-pivalate, is obtained.

EXAMPLE 9

By using as starting materials 2α-fluoro-, 2α-chloro-, or 2α-bromo-19-hydroxycholesta-4,6-dien-3-one 19-acetate or 19-propionate, and reacting the above compounds with potassium hydroxide in methanol at room temperature for one hour, or with 4 N aqueous hydrochloric acid-methanol 1:5 at the reflux temperature of the mixture for six hours, and recrystallizing from methanol, 2,19-epoxycholesta-4,6-dien-3-one, M.P. 115–117° C., is obtained.

EXAMPLE 10

Using as starting materials 2α-fluoro-, 2α-chloro-, or 2α - bromo - 17β,19-dihydroxyandrosta-4,6-dien-3-one 17, 19-diacetate, 17-acetate-19-propionate, 17,19-dipropionate,, 17-propionate-19-acetate, 17-butyrate-19-acetate, or 17-butyrate-19-propionate, and reacting the above compounds with potassium hydroxide in methanol at room temperature for one hour, or with 4 N aqueous hydrochloric acid-methanol 1:5 at the reflux temperature of the mixture for six hours, and recrystallizing from methanol, 2,19 - epoxy,17β-hydroxyandrosta-4,6-dien-3 - one, M.P. 204–207° C., is obtained.

EXAMPLE 11

A solution of 2.0 g. of 2,19-epoxy-17β-hydroxyandrosta-4,6-dien-3-one in 5 ml. of pyridine and one ml. of acetic anhydride is allowed to stand at room temperature for 24 hours. The reaction mixture is then diluted with water. The resulting precipitate is collected, dried, and recrystallized from methanol to afford 2,19-epoxy-17β-hydroxyandrosta-4,6-dien-3-one 17-acetate, $$\lambda_{max.}^{EtOH} \ 285 \ m\mu \ (\epsilon=25,600)$$

In the same manner, but using an equivalent amount of propionic anhydride or butyric anhydride instead of acetic anhydride, the corresponding 17-propionate and 17-butyrate of 2,19-epoxy-17β-hydroxyandrosta-4,6-dien-3-one, are also obtained.

We claim:
1. A compound selected from the group having the formula

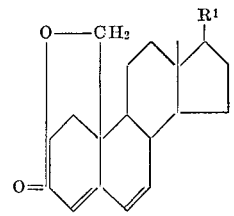

wherein $R^1$ is selected from the group which consists of hydroxy, acyloxy containing from two to five carbon atoms, and 1,5-dimethylhexyl.

2. 2,19-epoxy-17β-hydroxyandrosta-4,6-dien-3-one, as claimed in claim 1.

3. 2,19-epoxy-17β-hydroxyandrosta-4,6-dien-3-one 17-acetate, as claimed in claim 1.

4. 2,19-epoxy-17β-hydroxyandrosta-4,6-dien-3-one 17-pivalate, as claimed in claim 1.

5. 2,19-epoxycholesta-4,6-dien-3-one, as claimed in claim 1.

References Cited

UNITED STATES PATENTS 3,170,922  2/1965  Counsell et al.
3,178,416  4/1965  Wettstein et al.

HENRY A. FRENCH, Primary Examiner

U.S. Cl. X.R.

260—397.4, 999

UNITED STATES PATENT OFFICE
CERTIFICATE OF CORRECTION

Patent No. 3,493,564     Dated Feb. 3, 1970

Inventor(s) Gunther Kruger and Anthonie Verwijs

It is certified that error appears in the above-identified patent and that said Letters Patent are hereby corrected as shown below:

Column 8, Claim 1, the formula should read:

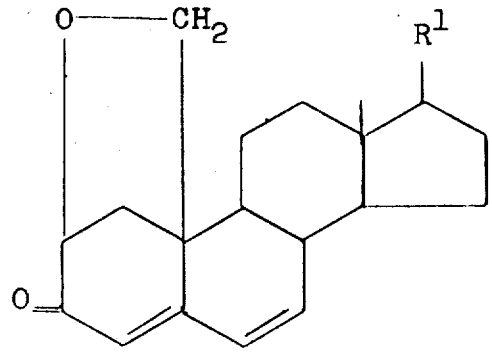

SIGNED AND SEALED

AUG 4 - 1970

(SEAL)
Attest:

Edward M. Fletcher, Jr.
Attesting Officer

WILLIAM E. SCHUYLER, JR.
Commissioner of Patents